(12) United States Patent
Burke et al.

(10) Patent No.: US 7,108,216 B2
(45) Date of Patent: Sep. 19, 2006

(54) RETRACTABLE CORD REELS FOR USE WITH FLAT ELECTRICAL CABLE

(75) Inventors: Paul C. Burke, Lake Forest, IL (US); D. Scott Kalous, Gurnee, IL (US)

(73) Assignee: Telefonix, Inc., Waukegan, IL (US)

( * ) Notice: Subject to any disclaimer, the term of this patent is extended or adjusted under 35 U.S.C. 154(b) by 0 days.

(21) Appl. No.: 10/411,810

(22) Filed: Apr. 11, 2003

(65) Prior Publication Data

US 2004/0200919 A1 Oct. 14, 2004

(51) Int. Cl.
*B65H 75/48* (2006.01)
(52) U.S. Cl. .................. 242/378.1; 242/388.1
(58) Field of Classification Search ............. 242/378.1, 242/388.1
See application file for complete search history.

(56) References Cited

U.S. PATENT DOCUMENTS

| | | | |
|---|---|---|---|
| 1,247,672 A | 11/1917 | Hallberg |
| 1,276,825 A | 8/1918 | Swope |
| 1,442,999 A | 1/1923 | Boyle |
| 1,663,083 A | 3/1928 | Kavle |
| 1,737,978 A | 12/1929 | Sebell |
| 1,865,069 A | 6/1932 | Allen |
| 1,958,626 A | 5/1934 | Krantz |
| 1,977,209 A | 10/1934 | Sargent |
| 2,031,434 A | 2/1936 | Stern et al. |
| 2,206,352 A | 7/1940 | Hellmann |
| 2,211,561 A | 8/1940 | Flannelly |
| 2,262,587 A | 11/1941 | Kaempf |
| 2,438,082 A | 3/1948 | Wester et al. |
| 2,576,335 A | 11/1951 | Fanslow |
| 2,678,779 A | 5/1954 | Bellmer |
| 2,751,565 A | 6/1956 | Johnston |
| 2,821,453 A | 1/1958 | Jessen |
| 2,821,579 A | 1/1958 | Benjamin |
| 2,937,396 A | 5/1960 | Momberg et al. |
| 2,979,576 A | 4/1961 | Huber |
| 3,061,234 A | 10/1962 | Morey |
| 3,490,715 A | 1/1970 | Nicpon |
| 3,584,157 A | 6/1971 | Prescott |
| 3,617,659 A | 11/1971 | Freeman |

(Continued)

FOREIGN PATENT DOCUMENTS

DE 466572 10/1928

(Continued)

OTHER PUBLICATIONS

International Search Report and Written Opinion, International Bureau, Nov. 24, 2004, 6 sheets.

*Primary Examiner*—Kathy Matecki
*Assistant Examiner*—Sang Kim
(74) *Attorney, Agent, or Firm*—Patzik, Frank & Samotny Ltd.

(57) ABSTRACT

Retractable cord reels are disclosed. The retractable cord reels include a housing portion and a spool disposed within the housing portion. The spool has an outer surface associated with an expansion chamber within the housing portion, an inner channel configured to hold a wound length of flat electrical cable and a passage extending between the outer surface and the inner channel. The retractable cord reels also include a flat electrical cable having a first portion disposed in the expansion chamber, a second portion disposed in the inner channel, and a third portion disposed in the passage to follow a path from the outer surface of the spool to the inner channel.

17 Claims, 5 Drawing Sheets

U.S. PATENT DOCUMENTS

| | | |
|---|---|---|
| 3,657,491 A | 4/1972 | Ryder et al. |
| 3,705,962 A | 12/1972 | Banister |
| 3,773,987 A | 11/1973 | Davis et al. |
| 3,782,654 A | 1/1974 | Kasa |
| 3,812,307 A | 5/1974 | Wagner et al. |
| 3,858,011 A | 12/1974 | Salvin et al. |
| 4,002,311 A | 1/1977 | Fisher et al. |
| 4,008,791 A | 2/1977 | Shafii-Kahany et al. |
| 4,053,118 A | 10/1977 | Aikins |
| 4,062,608 A | 12/1977 | Pierce |
| 4,081,153 A | 3/1978 | Tanaka et al. |
| 4,141,438 A | 2/1979 | Diem |
| 4,150,798 A | 4/1979 | Aragon |
| 4,232,837 A | 11/1980 | Cutler et al. |
| 4,384,688 A | 5/1983 | Smith |
| 4,386,744 A | 6/1983 | Higbee |
| 4,485,278 A | 11/1984 | Schaller et al. |
| 4,499,341 A | 2/1985 | Boyd |
| 4,517,757 A | 5/1985 | Asada et al. |
| 4,646,987 A | 3/1987 | Peterson |
| 4,713,497 A | 12/1987 | Smith |
| 4,736,826 A | 4/1988 | White et al. |
| 4,757,955 A | 7/1988 | Simmons |
| 4,813,627 A | 3/1989 | Nelson |
| 4,844,373 A | 7/1989 | Fike, Sr. |
| 4,940,859 A | 7/1990 | Peterson |
| 4,989,805 A | 2/1991 | Burke |
| 5,094,396 A | 3/1992 | Burke |
| 5,109,412 A | 4/1992 | Hollowed et al. |
| 5,114,091 A | 5/1992 | Peterson et al. |
| 5,124,685 A | 6/1992 | Rankin |
| 5,128,993 A | 7/1992 | Skowronski |
| 5,155,766 A | 10/1992 | Skowronski |
| 5,156,242 A | 10/1992 | Ditzig |
| 5,289,987 A | 3/1994 | Collins et al. |
| 5,332,171 A | 7/1994 | Steff |
| 5,410,597 A | 4/1995 | Kepley, III et al. |
| 5,520,350 A | 5/1996 | Doty et al. |
| 5,526,997 A | 6/1996 | Karczmer |
| 5,535,960 A | 7/1996 | Skowronski et al. |
| 5,544,836 A | 8/1996 | Pera |
| 5,581,821 A | 12/1996 | Nakano |
| 5,588,626 A * | 12/1996 | Yang .................. 242/378.1 |
| 5,590,749 A | 1/1997 | Wagner et al. |
| 5,603,416 A | 2/1997 | Richardson et al. |
| 5,655,143 A | 8/1997 | Alpert et al. |
| 5,701,981 A | 12/1997 | Marshall et al. |
| 5,718,310 A | 2/1998 | Gallo |
| 5,744,218 A | 4/1998 | Barnes |
| 5,973,264 A | 10/1999 | O'Connor |
| 6,019,304 A | 2/2000 | Skowronski et al. |
| 6,164,582 A | 12/2000 | Vara |
| 6,300,573 B1 | 10/2001 | Horie et al. |
| 6,305,632 B1 * | 10/2001 | Hwang ............... 242/378.1 |
| 6,372,988 B1 | 4/2002 | Burke et al. |
| 6,378,797 B1 * | 4/2002 | Liao .................. 242/378.1 |
| 6,439,491 B1 * | 8/2002 | Liao .................. 242/378.1 |
| 6,446,898 B1 * | 9/2002 | Hwang ............... 242/378.1 |
| 6,495,756 B1 | 12/2002 | Burke et al. |
| 6,644,582 B1 * | 11/2003 | Liao .................. 242/378.1 |
| 6,736,346 B1 * | 5/2004 | Park .................. 242/378.1 |
| 2001/0028013 A1 | 10/2001 | Dimberger et al. |
| 2002/0040945 A1 * | 4/2002 | Stepancich et al. ...... 242/378.1 |

FOREIGN PATENT DOCUMENTS

| | | |
|---|---|---|
| DE | 171356 | 11/1951 |
| DE | 3363617 | 5/1983 |
| DE | 3518157 | 11/1988 |
| GB | 2316672 A | 4/1998 |
| JP | 09054882 | 2/1997 |
| TW | 343012 | 10/1998 |
| TW | 344922 | 11/1998 |
| WO | 98/09415 | 3/1998 |

* cited by examiner

RETRACTABLE CORD REELS FOR USE WITH FLAT ELECTRICAL CABLE

FIELD OF THE DISCLOSURE

The present disclosure relates generally to retractable cord reels and, more specifically, to retractable cord reels for use with flat electrical cable.

BACKGROUND

Retractable cord reels are commonly used in a wide variety of applications involving a wide range of environmental conditions, electrical signal types and numbers, and expected or required extension/retraction cycles. For example, retractable cord reels may be used in hazardous environments such as those that expose the cord reel to explosive gases, combustible fluids, etc., may be used in wet environments such as marine or other outdoor environments, may be used in environments that expose the cord reel to other contaminants such as dust, corrosive gases, oil, etc., to name a few. Additionally, some cord reels are used in applications involving a relatively large number of low power signals such as, for example, telephone applications, data transmission applications, etc. Many of these low power applications subject the cord reel to a relatively large number of extension/retraction cycles. Other cord reel applications involve a relatively small number of high power signals such as, for example, line voltage extension cord applications.

In any event, conventional retractable cord reel devices typically include a fixed portion of electrical cable and an extendable portion of cable. The extendable portion of electrical cable is usually wound on a spring-loaded spool and, thus, may be withdrawn or extended from the cord reel and, if desired, retracted back into the cord reel. As the extendable cable portion is withdrawn, it typically rotates the spool against the force of a spring. The energy stored in the spring may subsequently be used to rotate the spool in the opposite direction to retract the extendable cable portion into the cord reel. Of course, providing a continuous electrical connection between the fixed and extendable cable portions is not a simple matter, particularly due to the relative rotation between the fixed cable portion and the spool carrying the extendable cable portion.

Some known retractable cord reels utilize rotating contacts such as, for example, brushes and commutating rings, to provide electrical continuity between the fixed cable portion and the rotating spool on which the extendable cable portion is wound. With these types of cord reels, the extendable cable portion is usually electrically coupled to commutating rings that are integral to the rotating spool and the fixed cable portion is electrically coupled to brushes that are fixed to the cord reel housing and urged against the commutating rings. Unfortunately, such moving or rotating contacts are subject to wear and, thus, significantly reduce the life cycle of the cord reel. Further, these moving or rotating contacts have a propensity to generate sparks, which is unacceptable for use in hazardous environments and are prone to contamination from dirt, dust, liquids, etc. that may be common in many cord reel applications. Still further, rotating or moving contacts are electrically noisy, difficult to shield from environmentally induced noise and, as a result, are generally unsuitable for carrying low power, low-level signals.

More recently, some cord reels have been developed that eliminate the need for moving or rotating contacts. These cord reels utilize a substantially continuous cable having a flat portion and a round portion. The round portion of the cable is wound on a rotatable spool and the flat portion of the cable is spirally wound in an expansion chamber adjacent to a hub of the spool. As the round cable portion is withdrawn or extended form the cord reel, the spirally wound flat cable portion first unwinds or expands and then is rewound or contracts about a hub or other feature of the spool. One example of such a cord reel is disclosed in U.S. Pat. No. 6,372,988 to Burke et al.

While cord reels having a substantially continuous electrical cable including a round extendable portion and a flat fixed portion have proved useful in a wide variety of applications including, for example, applications involving telephone signals, audio signals, data signals, etc., the cable used in such devices is typically relatively complicated and expensive to manufacture. Furthermore, while the types of cables used for many low power applications such as those noted above can be formed to have a relatively flat portion and a relatively round portion along a continuous length of cable, many cables such as, for example, heavy-gauge power cables are difficult, if not impossible, to modify in this manner. Still further, due to safety requirements, much heavy gauge flat cable utilizes a relatively thick and rigid jacket or insulation. As a result, a fixed portion made of such heavy gauge cable may fail prematurely, because when it transitions between the contraction and expansion modes within the expansion chamber bending stresses are typically concentrated at a single point or area of the cable over an approximately one hundred-eighty degree bending cycle.

DETAILED DESCRIPTION

Figure 1:
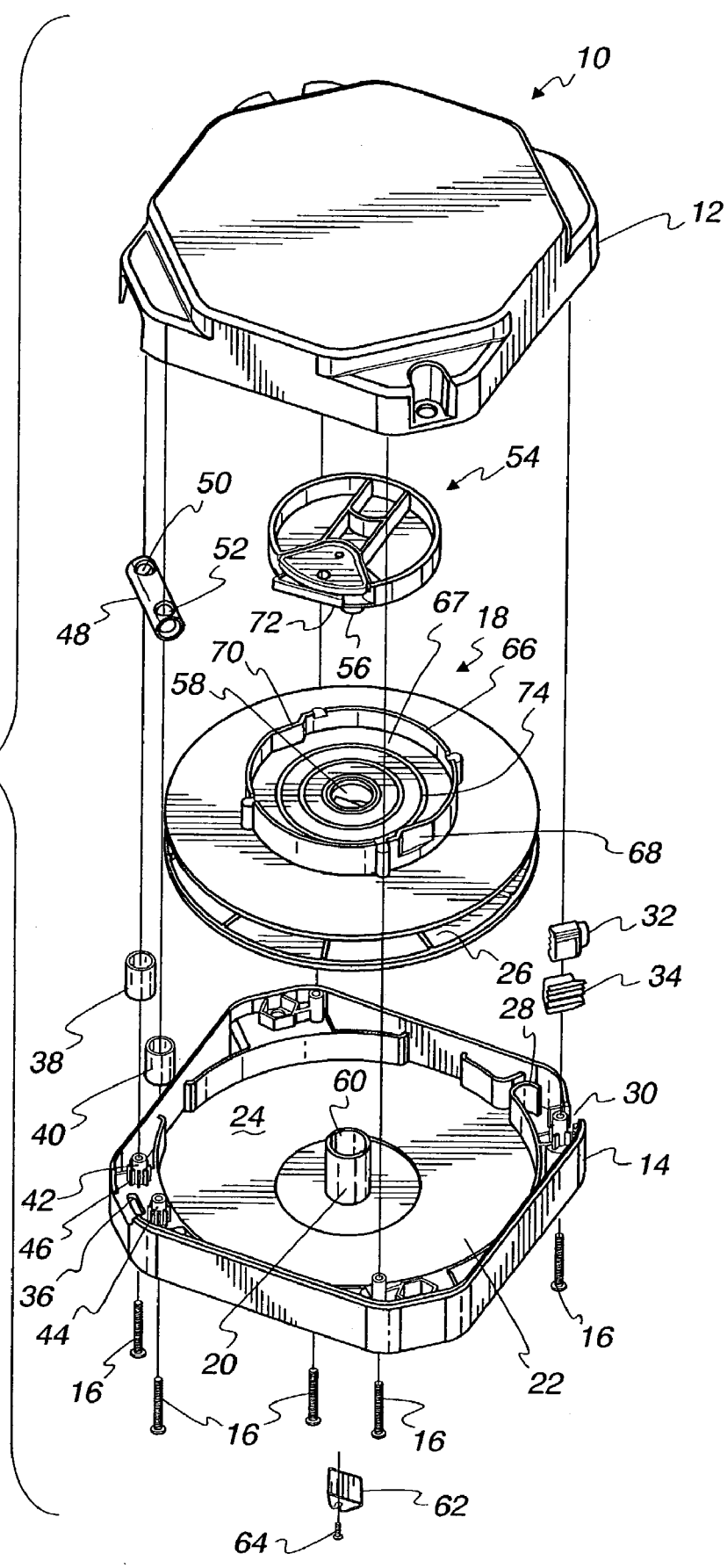
FIG. 1 is an exploded isometric view of an example cord reel for use with flat cable.

FIG. 1 is an exploded isometric view of an example cord reel 10 for use with flat cable. The example cord reel 10 is configured to hold a flat electrical cord or cable (shown in FIGS. 3–5) having a retractable portion, a transition portion and an expansion portion. The example cord reel 10 includes a housing having an upper portion 12 and a lower portion 14. The upper and lower housing portions 12 and 14 may be joined together via fasteners 16. The fasteners 16 may be threaded fasteners such as, for example, self-tapping screws or bolts. Alternatively or additionally, the upper and lower housing portions 12 and 14 may be joined using press and/or snap fit features, adhesives, ultrasonic welding and/or any other suitable fastening techniques.

A spool 18 is disposed within the cord reel 10. The spool 18 engages and rotates about a hub 20 that is integrally formed with the lower housing portion 14. With the spool 18 disposed on the hub 20, an expansion chamber or cavity 22 is formed between the spool 18 and a surface 24 of the lower housing portion 14. As described in greater detail below in connection with FIGS. 3 and 4, a portion of an electrical cable wound on an outer surface of the spool 18 expands and contracts within the expansion chamber 22 as a retractable portion of the electrical cable, which is wound on a channel 26 of the spool 18, is withdrawn from or retracted into the cord reel 10.

The lower housing portion 14 also includes a channel 28 and an opening 30 that are configured to enable a flat electrical cable to pass from the expansion chamber 22 out of the cord reel 10. Exit bushings or grommets 32 and 34 may be disposed on opposing sides of the opening 30 to provide strain relief to a portion of the flat electrical cable exiting the cord reel 10. The exit bushings 32 and 34 may be made from an elastomeric material such as, for example, rubber, a thermoplastic material, or any other suitable material. In any case, the exit bushings 32 and 34 are configured to grip the outerjacket of a heavy gauge flat electrical cable. The exit bushings 32 and 34 are optional and may be eliminated in the event that strain relief is not needed or desired and/or in the event that strain relief is provided via one or more other feature(s) of the cord reel 10 and/or via a mechanism external to the cord reel 10.

The lower housing portion 14 also includes another opening 36 through which a retractable portion of the electrical cable wound within the channel 26 of the spool 18 passes to exit the cord reel 10. Sleeves or bushings 38 and 40 are disposed on respective posts 42 and 44 on opposing sides of the opening 36. The bushings 38 and 40 are dimensioned to rotate freely about their longitudinal axes and the posts 42 and 44. The posts 42 and 44 may include elongated protrusions or ribs 46 that extend along the longitudinal axes of the posts 42 and 44 as depicted in FIG. 1. The protrusions or ribs 46, if included, serve to reduce the amount of contact surface area between posts 42 and 44 and the inner surfaces of the sleeves or bushings 38 and 40, thereby facilitating rotation of the sleeves or bushings 38 and 40 about the posts 42 and 44. In use, as the retractable portion of the electrical cable is withdrawn from or retracted into the cord reel 10 through the opening 36, the rotatable bushings or sleeves 38 and 40 prevent the retractable portion of the electrical cable from binding against or otherwise being impeded by the housing 12, 14, regardless of the angle at which the retractable portion of the electrical cable is withdrawn from or retracted into the cord reel 10. Another bushing or sleeve 48 may be disposed adjacent to the opening 36 to guide or maintain the retractable portion of the electrical cord in alignment with the channel 26 of the spool 18. The bushing or sleeve 48 includes apertures 50 and 52 that are dimensioned to accept the top portions of the posts 42 and 44 and/or mounting posts or pins within the upper housing portion 12 (not shown). As depicted in FIG. 1, the bushing or sleeve 48 does not rotate (i.e., is fixed to the housing 12, 14) when the retractable portion of the electrical cord is withdrawn from or retracted into the cord reel 10.

The bushings or sleeves 38, 40 and 48 may be made of a thermoplastic material such as, for example, nylon, that provides a substantially self-lubricating quality and/or which provides a suitably minimal amount of friction between the retractable portion of the electrical cable and the bushings or sleeves 38, 40 and 48. Optionally, some or all of the bushings or sleeves 38, 40 and 48 may eliminated and/or provided via one or more structures external to the cord reel 10.

As shown in FIG. 1, the cord reel 10 also includes a ratchet assembly 54 having a post or shaft 56 (shown more clearly in FIG. 6) that extends through an axial bore or passage 58 of the spool 18 into a bore or passage 60 of the hub 20. The shaft 56 of the ratchet assembly 54 is slotted (see FIG. 6) to receive and operatively engage a spring 108 (FIG. 2) that is disposed within the spool 18. A locking tab 62 engages with the slotted portion of the shaft 56 and is fixed to the lower housing portion 14 via a screw 64. Thus, the ratchet assembly 54 is fixed (i.e., does not rotate or move) with respect to the housing portions 12 and 14 as the spool assembly 18 rotates about the hub 20.

Figure 2:
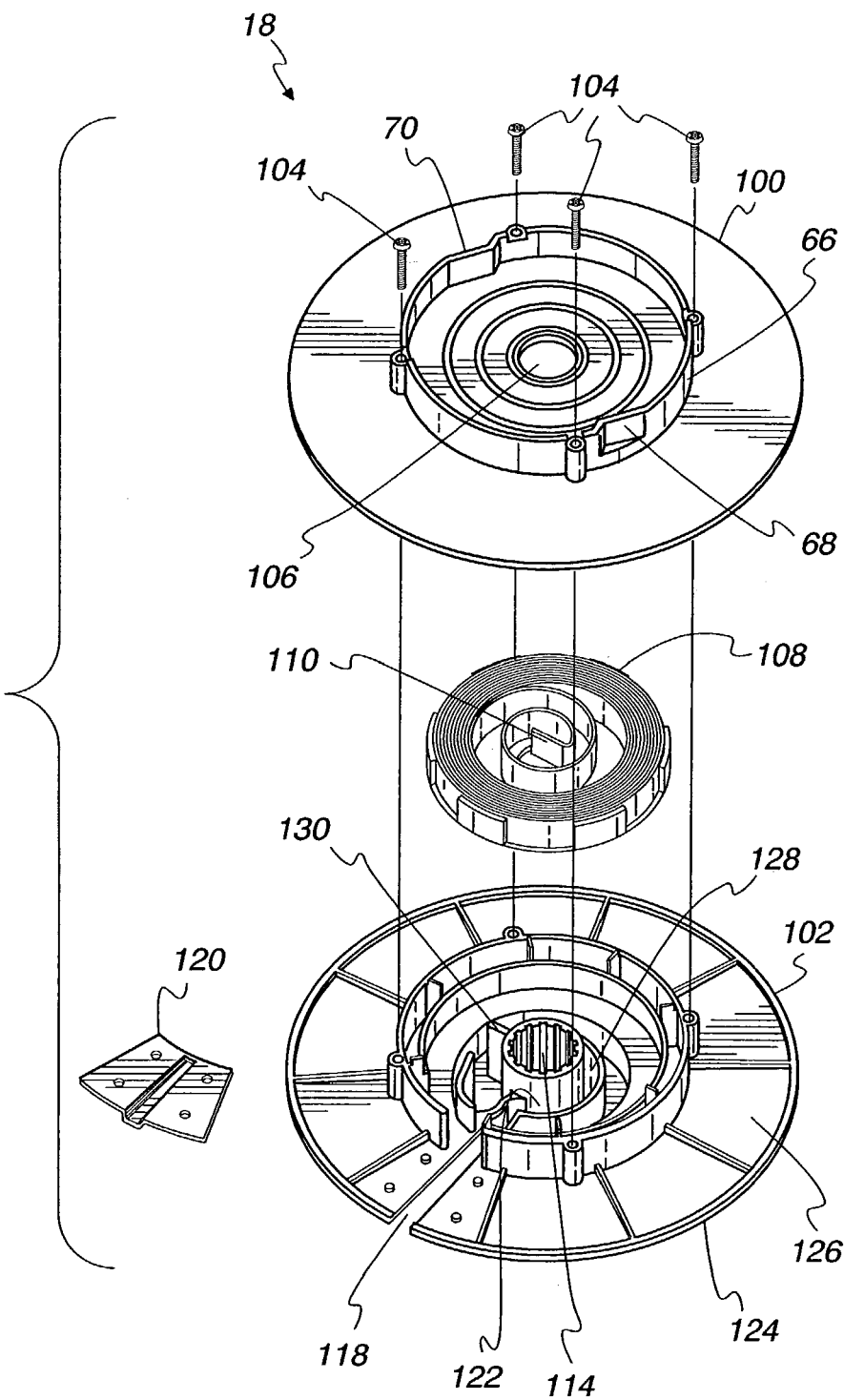
FIG. 2 is an exploded isometric view of the example spool shown in FIG. 1.

A wall 66 is integrally formed on spool assembly 18 to form a cavity 67 into which the ratchet assembly 54 is disposed. The wall 66 includes one or more ramped stop portions 68 and 70 that extend inwardly toward the bore 58. The stop portions 68 and 70 are configured to drive against a catch 72 of the ratchet assembly 54 to prevent counter-rotation of the spool assembly 18 (i.e., retraction of the electrical cable) as electrical cable is withdrawn from the cord reel 10 against the force of the spring 108 (FIG. 2). In particular, as electrical cord or cable is withdrawn from the cord reel 10 via the opening 36, the spool assembly 18 rotates counterclockwise. Because the ratchet assembly 54 is fixed to the lower housing portion 14 and because the spring 108 (FIG. 2) is fixed to the spool 18, the counterclockwise rotation of the spool 18 winds the spring 108 (FIG. 2) (i.e., stores mechanical energy in the spring 108). As described in greater detail in connection with FIGS. 6–8 below, the catch 72 is configured to stop the counter-rotation (e.g., the clockwise rotation) of the spool 18 following a withdrawal of electrical cord from the cord reel 10. Additionally, once the catch 72 has stopped the counter-rotation of the spool 18, the catch 72 can be caused to change its mechanical state to permit retraction of the electrical cord using the mechanical energy stored in the spring 108 (FIG. 2). One or more ridges or raised areas 74 may be employed within the cavity to reduce the amount of surface area contact between the ratchet assembly 54 and the spool 18 and minimize the friction therebetween. In addition, grease, oil, or other lubricant may be applied to the raised areas 72 to facilitate the rotation of the spool 18 against the ratchet assembly 54.

Some or all of the components of the cord reel 10 shown in FIG. 1 may be made of any suitable plastic that can be injection molded, machined, or otherwise fabricated. Alternatively, some or all of the components of the cord reel 10 may be made of a metal that is cast, injection molded, machined or otherwise fabricated. Of course, the materials selected for the components of the cord reel 10 may be selected to suit the particular environmental conditions under which use of the cord reel 10 is anticipated. For example, materials may be selected to enable the cord reel 10 to function within high humidity conditions and/or wet conditions, high temperature conditions, corrosive gas environments, etc.

Additionally, while the example cord reel 10 shown in FIG. 1 is described as having a two-piece housing, the cord reel 10 could instead be provided with a unitary housing structure (i.e., a one-piece design), without the upper housing portion 12, without any structure resembling a housing, or in any other desired configuration.

FIG. 2 is an exploded isometric view of the example spool 18 shown in FIG. 1. The spool 18 includes a first portion 100 and a second portion 102 that are joined via fasteners 104. The fasteners 104 may be self-taping screws or bolts.

Alternatively or additionally, other fastening techniques such as, for example, adhesives, ultrasonic welding, etc. may be used.

The first portion 100 of the example spool 18 includes an aperture 106 that forms an opening to the bore or passage 58 (FIG. 1) that extends through the spool 18. The spring 108 is coaxially aligned with the aperture 106 and the bore 58 (FIG. 1). An end or tab 110 of the spring 108 engages with a slot 112 (FIG. 6) of the ratchet assembly 54. The spring 108 is rigidly fixed to the first portion 100 and, thus, when electrical cord or cable is withdrawn from the cord reel 10, the spool 18 rotates counterclockwise and the spring 108 rotates counterclockwise. Because the tab portion 110 of the spring 108 is captured by the slot 112 (FIG. 6) of the ratchet assembly 54, the counterclockwise rotation of the spool 18 stores mechanical energy in the spring 108 (i.e., winds the spring). Such stored mechanical energy may subsequently be used to rotate the spool 18 clockwise to retract the electrical cord or cable into the cord reel 10. Of course, any desired spring such as, for example, a B-motor type spring could be used to perform the functions of the spring 108.

The second portion 102 of the spool 18 includes a bore 114, which is coaxially aligned with the tab 110 and the aperture 106 for form a part of the bore or passage 58 (FIG. 1). The bore 114 may include raised portions (e.g., splines or ribs) that extend along the longitudinal axis of the bore 114. Such raised portions serve to reduce the amount of contact area between the inner surface of the bore 114 and the hub 20 (FIG. 1), thereby reducing the frictional forces that impede the free rotation of the spool 18.

The second portion 102 of the spool 18 also includes a slot 118 that, as described in greater detail below, facilitates the winding of a continuous length of electrical cable on the spool 18. An insert or cover plate 120 may be secured to the second portion 102 to cover the slot 118, thereby strengthening the second portion 102 and preventing the edges defining the slot 118 from contacting or otherwise interfering with the movement of the electrical cable. The insert or cover plate 120 may be fastened to the second portion 102 in any desired manner, including, for example, via screws, adhesives, snap fits, press fits, etc.

As shown in FIG. 2 and as described in connection with FIGS. 3–5 below, the second portion 102 of the spool 18 includes a passage 122 that extends between an outer surface 124 to an inner surface 126, which forms a part of the channel 26 (FIG. 1). The passage 122 provides a substantially curved path that enables a continuous length of electrical cable to transition smoothly (e.g., without sharp bends or kinks) from the outer surface 124 to the inner surface 126. The passage 122 includes a spiral portion 128 that surrounds the bore 114 and also includes a protrusion 130 that may engage the electrical cable to serve as a strain relief to the cable.

Figure 3:
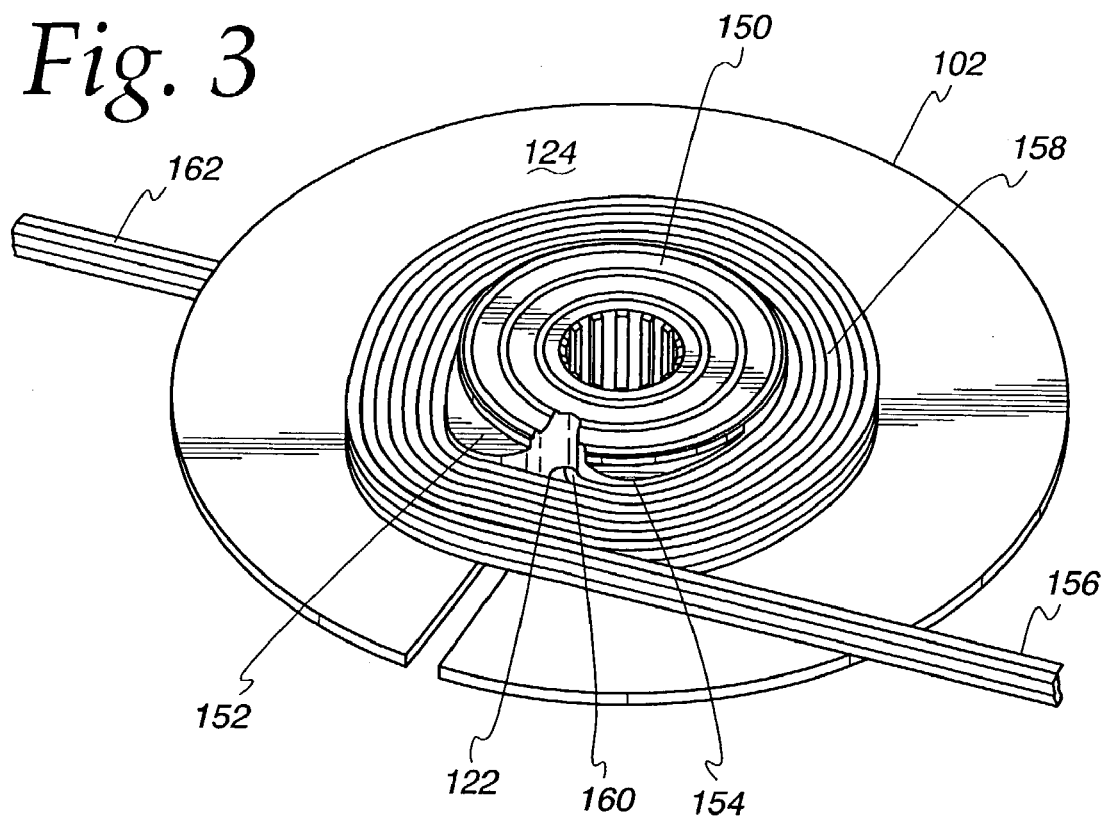
FIG. 3 is an isometric view of the expansion chamber side of the example spool shown in FIGS. 1 and 2.

FIG. 3 is an isometric view of the expansion chamber side or outer surface 124 of the second portion 102 of the example spool 18 shown in FIGS. 1 and 2. As shown in FIG. 3, the second portion 102 includes a raised portion 150 having curved portions 152 and 154 against which an electrical cable 156 may bear.

The electrical cable 156 is a flat, heavy gauge electrical cable having a plurality of electrical conductors therein. As is typical of heavy gauge electrical cabling, the electrical cable 156 may have a relatively thick electrically insulating jacket or covering. Such thick cabling jackets are especially susceptible to fatigue (e.g., due to repeated flexing or bending) and cracking, which may lead to premature failure of the cabling via, for example, shorts, opens, etc. In general, the curved portions 152 and 154 serve to control the manner in which the electrical cable 156 is bent as it exits the passage 122. In particular, the curved portions 152 and 154 control the amount and distribution of bending stresses to which the cable 156 is subjected as the electrical cable 156 is withdrawn from and retracted into the cord reel 10.

As shown in FIG. 3, a first portion 158 of the electrical cable 156 is wound about the raised portion 150 and contacts the curved portions 152 and 154. A second portion 160 (which can be more clearly seen in FIG. 5) of the electrical cable 156 enters the passage 122 (which is disposed between the curved surfaces 152 and 154) and follows the passage 122 from the outer surface 124 to the inner surface 126 or channel 26 (FIG. 1). A third portion of the cable 162, some of which is wound about the spool 18 within the channel 26 and some of which is extended as shown, may be withdrawn from and/or retracted into the cord reel 10 (FIG. 1). As depicted in FIG. 3, the first portion 158 is substantially or fully wound in a counterclockwise direction, which corresponds to a condition in which the third portion 162 of the electrical cable 156 is fully or substantially withdrawn from the cord reel 10. In this condition, the first portion 158 contacts the curved portion 154 as the second portion 162 exits the passage 122 toward the outer surface 124 and produces a corresponding stress distribution along the second portion 158 of the electrical cable 156.

Figure 4:
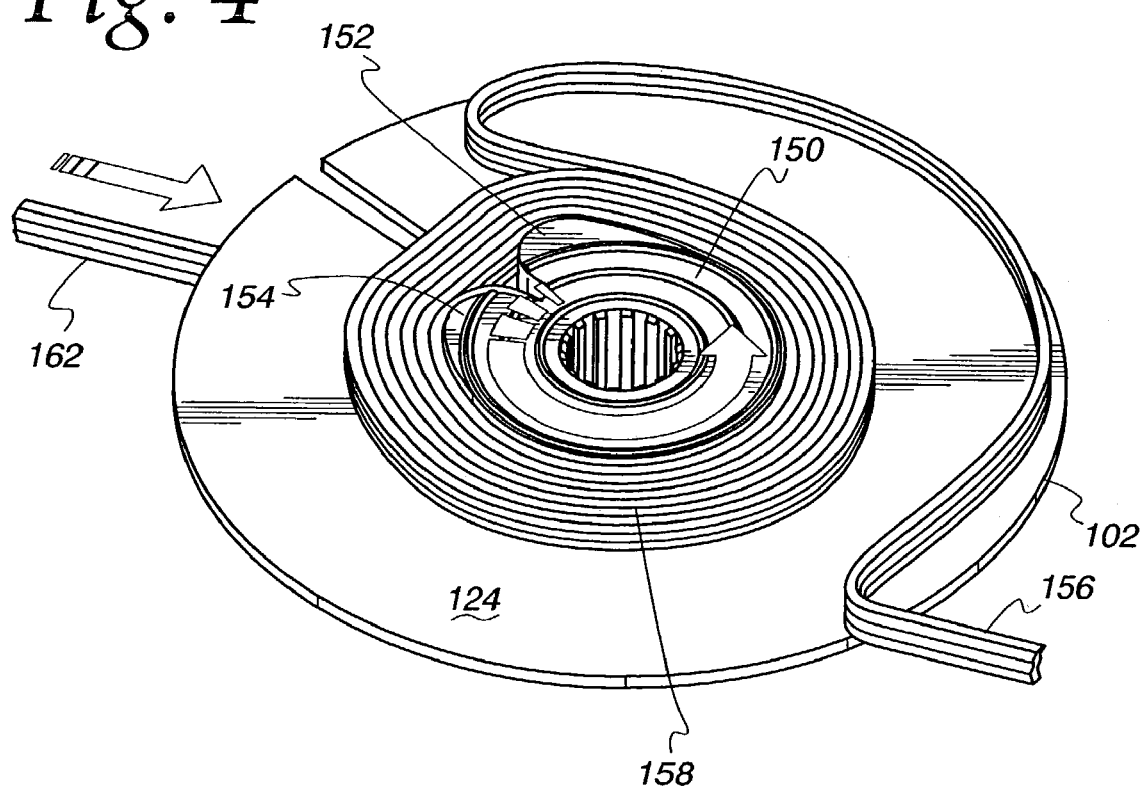
FIG. 4 is another view of the expansion chamber side of the example spool shown in FIGS. 1 and 2.

FIG. 4 is another isometric view of the expansion chamber side or outer surface 124 of the example spool 18 shown in FIGS. 1 and 2. In particular, in FIG. 4, the third portion 162 of the cable 156 is being retracted into the cord reel 10 (e.g., using the energy stored in the spring 108 during a previous withdrawal of the electrical cable 156 from the cord reel 10). As a result, the first portion 158 of the electrical cable 156 expands into the expansion chamber 22 (FIG. 1) as the first portion 158 unwinds from the raised portion 150. At some point during the retraction process, the first portion 158 is completely unwound from the raised portion 150 (i.e., is fully expanded within the expansion chamber 22) and begins to wrap or wind about the raised portion 150 in a clockwise direction (not shown). When this occurs, an opposing side of the first portion 158 of the electrical cable 156 first contacts the curved portion 152 as the electrical cable 156 exits the passage 122 and produces a corresponding stress distribution along the length of the electrical cable 156.

The curved portions 152 and 154 provide cam-like curved surfaces against which the first portion 158 of the electrical cable 156 may bear. Preferably, but not necessarily, the curved portions 152 and 154 are asymmetric with respect to the rotational axis of the spool 18. For example, each of the curved portions 152 and 154 may have a different radius profile with respect to the rotational axis of the spool 18. In this manner, the asymmetry of the curved surfaces 152 and 154 results in one stress distribution along the electrical cable 156 when the first portion 158 is wound in a clockwise direction on the spool 18 and another or different stress distribution along the electrical cable 156 when the first portion 158 is wound in a counterclockwise direction on the spool 18. By varying the amount and/or distribution of stresses imparted to the electrical cable 156, the number of bending cycles to which the electrical cable 156 may be subjected can be increased significantly, which increases the cycle life (e.g., the number of electrical cable withdrawal and retraction cycles) of the cord reel 10.

Figure 5:
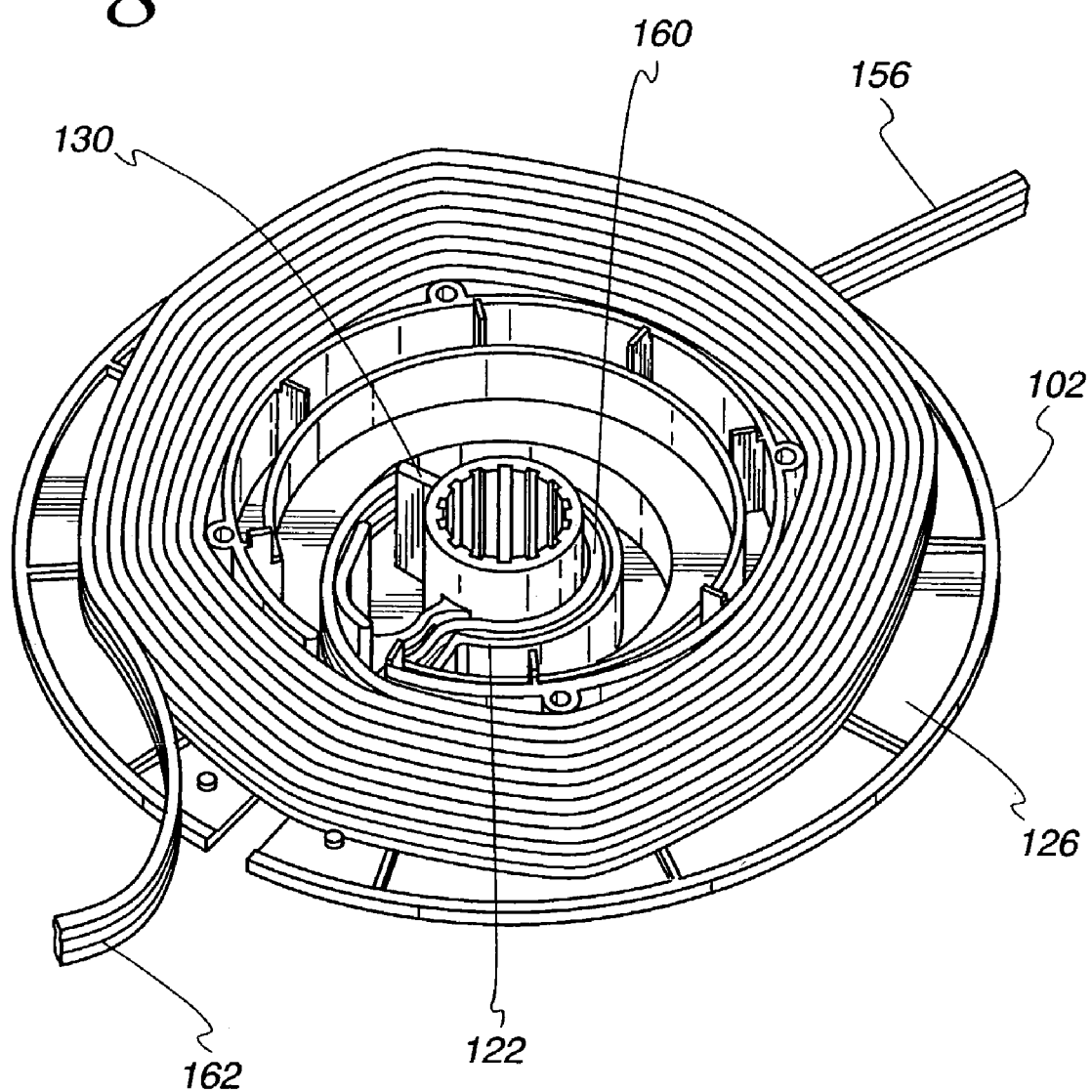
FIG. 5 is an isometric view of the extendable cable side of the example spool shown in FIGS. 1 and 2.

FIG. 5 is plan view of the inner surface 126 of the example spool 18 shown in FIGS. 1 and 2. In particular, FIG. 5 illustrates the manner in which the second portion 160 of the electrical cable 156 is disposed within the passage 122 and the manner in which the third portion 162 of the electrical cable 156 is wound within the channel 26 of the spool 18. FIG. 5 depicts the electrical cable in a substantially or fully retracted condition.

Figure 6:
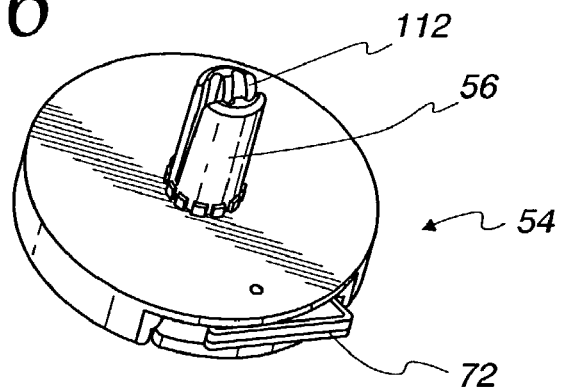
FIG. 6 is a bottom isometric view of the example ratchet assembly shown in FIG. 1.
Figure 7:
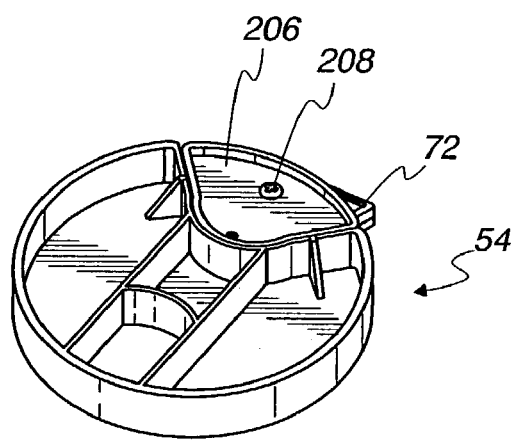
FIG. 7 is a top isometric view of the example ratchet assembly shown in FIGS. 1 and 6.
Figure 8:
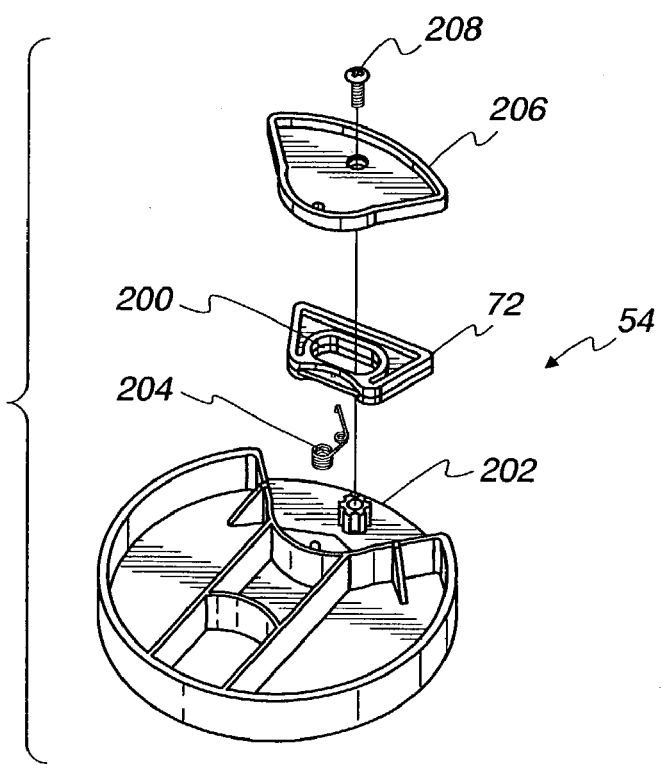
FIG. 8 is an exploded assembly view of the example ratchet assembly shown in FIGS. 1, 6 and 7.

FIG. 6 is bottom isometric view of the example spindle 54 shown in FIG. 1, FIG. 7 is a top isometric view of the example spindle 54 shown in FIG. 1 and FIG. 8 is an exploded assembly view of the example spindle 54 shown in FIGS. 1, 6 and 7. As most clearly shown in FIG. 8, the catch 72 includes an elongated opening dimensioned to loosely accommodate a post 202. A spring 204 biases the catch 72 in one of two states to provide a well-known ratcheting function. A cover plate 206 is fastened to the post 202 via a fastener 208 to capture or hold the spring 204 and catch 72 in an operative relationship.

From the foregoing description, it can be appreciated that the disclosed cord reel apparatus enables a continuous length of flat electrical cable to provide a fixed or expansion portion, a transition portion that follows a path from the expansion chamber side of a cord reel spool to a channel side of the spool, and a retractable portion that is wound on the spool and which may be withdrawn from and/or retracted into the spool. Additionally, the disclosed apparatus includes a raised feature on the expansion chamber side of the spool that provides asymmetric curved portions against which the cord in the expansion chamber (i.e., the fixed portion of the cord) is wound. The asymmetric nature of the curved portions results in one distribution of bending stresses along the length of the cable when the cable is wound in a clockwise direction about the raised portion and another distribution of bending stresses along the length of the cable when the cable is wound in a counterclockwise direction. This variation in the distribution of bending stresses can significantly extend the cycle life of the electrical cord within the cord reel.

Although certain apparatus have been described herein, the scope of coverage of this patent is not limited thereto. To the contrary, this patent covers all embodiments fairly falling within the scope of the appended claims either literally or under the doctrine of equivalents.

What is claimed is:

1. A retractable cord reel, comprising:
    a housing portion;
    a spool disposed within the housing portion and having an outer surface associated with an expansion chamber within the housing portion, an inner channel configured to hold a wound length of flat electrical cable and a passage extending between the outer surface and the inner channel;
    a raised portion extending from the outer surface of the spool, the raised portion including a first curved portion disposed adjacent a first side of the passage and a second curved portion disposed adjacent a second side of the passage opposite the first curved portion, the first curved portion having a first asymmetric radius profile and the second curved portion having a second asymmetric radius profile different than the first asymmetric radius profile; and
    a flat electrical cable having a first portion disposed in the expansion chamber, a second portion disposed in the inner channel, and a third portion disposed in the passage to follow a path from the outer surface of the spool to the inner channel, the spool being rotatable such that the second portion of the flat electrical cable is movable between an extended position and a retracted position to cause a first location on the first portion of the flat electrical cable to contact the first curved portion when the flat electrical cable is moved toward the extended position, and to cause a second location on the first portion of the flat electrical cable to contact the second curved portion when the flat electrical cable is moved toward the retracted position.

2. The retractable cord reel as defined in claim 1, wherein the path from the outer surface of the spool to the inner channel is a substantially curved path.

3. The retractable cord reel as defined in claim 1, wherein the substantially curved path includes an approximately spiral portion.

4. The retractable cord reel as defined in claim 1, wherein the each of the curved portions is associated with a different stress distribution along the length of the first portion of the flat electrical cable.

5. The retractable cord reel as defined in claim 1, further comprising a spring coupled to the spool to retractably rotate the spool.

6. The retractable cord reel as defined in claim 1, wherein the flat electrical cable includes a plurality of electrical conductors.

7. The retractable cord reel as defined in claim 1, further comprising a ratchet assembly coupled to the spool and configured to prevent retraction of a retractable portion of the flat electrical cable.

8. The retractable cord reel as defined in claim 7, wherein the spool includes a cavity configured to operatively engage with the ratchet assembly.

9. The retractable cord reel as defined in claim 1, wherein the passage includes at least one protrusion that engages with the flat electrical cable to strain relieve the flat electrical cable.

10. The retractable cord reel as defined in claim 1, wherein the first portion of the flat electrical cable is wound within the inner channel of the spool.

11. A cord reel, comprising:
    a spool including a raised portion having first and second curved portions and a passage disposed between the first and second curved portions, wherein the first and second curved portions are asymmetric, and wherein the first asymmetric curved portion is different than the second asymmetric curved portion; and
    a continuous flat cable having a first portion wound on the spool, a second portion extending through the passage and a third portion wound about the raised portion.

12. The cord reel as defined in claim 11, wherein the second portion follows a curved path.

13. The cord reel as defined in claim 12, wherein the curved path includes an approximately spiral portion.

14. The spool as defined in claim 11, wherein the first and second asymmetric curved portions correspond to respective different stress distributions along a length of electrical cable.

15. The spool as defined in claim 11, wherein the wound length of cable includes a flat cable.

16. The spool as defined in claim 11, wherein the wound length of cable includes a plurality of electrical, conductors.

17. The spool as defined in claim 11, further comprising a spring for retractably rotating the spool.

* * * * *